Patented Sept. 16, 1947

2,427,519

UNITED STATES PATENT OFFICE 2,427,519

METHOD OF ADHESIVELY JOINING MATERIALS

Lee L. Blyler, Melrose, Mass., assignor to Compo Shoe Machinery Corporation, Boston, Mass., a corporation of Delaware No Drawing. Application June 14, 1946, Serial No. 676,850

10 Claims. (Cl. 12—142)

This invention relates to a method of adhesively joining surfaces and more particularly to a method of adhesively joining plasticized vinyl resin material to a non-vinyl resin material.

The invention is particularly useful in the manufacture of footwear for the permanent cement attachment of outsoles to shoe uppers when one of the surfaces to be joined is composed of a plasticized vinyl resin and the other surface is of leather, fabric, or the like.

Plasticized vinyl resin is now commonly used for shoe uppers, outsoles and welting. It has excellent wearing qualities and other properties which make it a desirable shoe material. However, cementing of the plasticized vinyl resin to other materials in general use for shoe parts is difficult and somewhat hazardous procedure since few known adhesives will satisfactorily bond to the vinyl resin. Some measure of success has been obtained with adhesives having a base of vinyl resin, chlorinated rubber, or a butadiene acrylonitrile polymer but even these fail to give continued adhesion due to their affinity for the liquid type plasticizers used in the vinyl resin material.

Most sheeted, molded or extruded vinyl resin material suitable for shoe parts is plasticized with a non-drying oily form of substance, e. g., dioctyl phthalate. These liquid type plasticizers are not truly chemically bound to the vinyl resin molecules and tend to bleed into and be absorbed by the adhesives used to bond the vinyl resin to other material. In shoes, the constant flexing of the plasticized vinyl resin also exudes the plasticizer which is then absorbed by the adhesive causing it to become a tacky soft plastic and consequently the outsole springs away from the upper.

I have found that by curing or toughening a butadiene acrylonitrile base adhesive, in the manner hereinafter described, it is made more resistant to the softening action of the plasticizers contained in the vinyl resin parts and that the strength of the bond between the plasticized vinyl resin material and the non-vinyl resin material is considerably enhanced.

An object of this invention is to provide an improved method of adhesively joining plasticized vinyl resin material to a non-vinyl resin material.

Another object of the invention is to provide a method of adhesively attaching plasticized vinyl resin outsoles to leather or fabric shoe uppers in a manner which makes the cement bond permanent and unaffected by the plasticizers contained in the vinyl resin material.

A further object of the invention is to provide an improved method of permanently cement attaching leather or fabric outsoles to plasticized vinyl resin shoe uppers.

A still further object of the invention is to provide an improved method of attaching an outsole to a shoe welt of plasticized vinyl resin.

Other objects of the invention will in part be obvious and will in part appear hereinafter.

The invention accordingly comprises the several steps and the relation of one or more such steps with respect to each of the others thereof, which will be exemplified in the method hereinafter disclosed, and the scope of the invention will be indicated in the claims.

I have discovered that a butadiene acrylonitrile base adhesive, which is one of the most satisfactory adhesives for bonding vinyl resin to other materials, is cured or toughened by the action of certain chrome salts so that it resists the softening action of the liquid type plasticizers which exude from the plasticized vinyl resin materials used for shoe parts.

In using my discovery in the accomplishment of the objects of this invention, it is preferable to join the plasticized vinyl resin material to other material with two different adhesives, the plasticized vinyl resin material being coated with a vinyl resin adhesive containing a chrome salt and the other material being coated with a butadiene acrylonitrile base adhesive. Thus, when the two parts are brought together the chrome salt migrates into the butadiene acrylonitrile film and accomplishes the curing action.

Such procedure is preferred because, if the chrome salt is compounded directly into the butadiene acrylonitrile adhesive it tends to cause instability of the solution and gells it within a short period of time. Whereas, when the chrome salt is incorporated in the vinyl resin adhesive solution the solution is stable and unaffected.

In practicing the method of my invention, a vinyl resin shoe upper is lasted in the usual manner and preferably, but not essentially, the overlasted margin is roughed. The overlasted margin of the plasticized vinyl resin upper is then coated with a vinyl resin adhesive solution containing a chrome salt, e. g., of the following formula:

Formula "A"

| | Per cent |
|---|---|
| Vinylite VMCH [1] | 20.00 |
| Methyl ethyl ketone | 70.00 |
| Saturated solution of ammonium dichromate in ethyl alcohol | 10.00 |
| | 100.00 |

[1] A product of Carbide and Carbon Chemicals Corporation.

The vinyl resin adhesive coating on the upper is allowed to dry tack free.

An outsole of leather, fabric or other non-vinyl resin material is prepared in the usual manner and preferably the marginal area of its attaching face is roughed. The marginal area of the attaching face of the outsole is then coated with a butadiene acrylonitrile base adhesive, e. g., of the following formula:

*Formula "B"*

| | Per cent |
|---|---|
| Hycar CR-25 [1] | 16.50 |
| Phenolformaldehyde resin | 7.60 |
| Filler | 4.20 |
| Methyl ethyl ketone | 71.70 |
| | 100.00 |

[1] A product of the Goodrich Rubber Company.

This coating on the outsole is also allowed to dry tack free.

The cemented outsole is then heated, preferably in the form of apparatus shown in the U. S. Patent to Card #2,377,208, to activate the cement thereon and while the cement is in a heat activated condition the outsole is brought into contact with the prepared plasticized vinyl resin shoe upper and the parts are placed in the usual form of shoe press until the adhesives have merged and a permanent bond is effected.

In attaching plasticized vinyl resin outsoles to leather or fabric shoe uppers, the above procedure may be followed except that the vinyl resin base adhesive containing the chrome salt is applied to the outsole and the butadiene acrylonitrile adhesive is applied to the shoe upper. The adhesive on the shoe bottom is heated to activate the cement or a solvent may be used.

In attaching an outsole to a welt shoe having a plasticized vinyl resin welting, the same procedure as used for attaching outsoles to vinyl resin uppers may be followed, i. e., the vinyl resin adhesive is applied to the welt and the butadiene acrylonitrile adhesive is applied to the outsole.

In testing the bond strength obtained with my improved method of joining surfaces, specimens of sole leather and plasticized vinyl resin sheeting measuring 1" x 6" were prepared and roughened on one side. The roughed side of the leather specimens were given two light coats of a butadiene acrylonitrile adhesive of the Formula "B" previously mentioned and the coatings were allowed to dry overnight. The roughed side of the plasticized vinyl resin specimens were given one coat of the vinyl resin adhesive according to the Formula "A" previously described and the coating was allowed to dry overnight.

The cemented leather specimens were then activated at a temperature of 190° F. for a period of one minute and they were then immediately brought into contact with the plasticized vinyl resin specimens and placed under a pressure of 50 lbs. per square inch. The adhesively joined specimens were allowed to age for the times shown in the following tabulation and were then pulled apart in a Scott tensile testing machine at a rate of two linear inches per minute with the following results.

| Leather specimens coated with— | Plasticized vinyl resin specimens coated with— | Average pull strength in lbs. per linear inch | | |
|---|---|---|---|---|
| | | Immediately after bonding | Aged 3 days | Aged 7 days |
| Formula "B" | Formula "A" | 35 | 40 | 48 |
| Formula "B" | Formula "B" | 11 | 24 | 26 |

Thus, it can be seen that when using my improved method the butadiene acrylonitrile adhesive is so cured and toughened by the action of the chrome salts that a remarkable increase in bond strength is obtained. I have found that such a toughened bond is more resistant to the action of the oily type of vinyl resin plasticizers than a butadiene acrylonitrile adhesive bond which has not been toughened or cured by the action of chrome salts.

Since certain changes may be made in carrying out the above method without departing from the scope of the invention, it is intended that all matter contained in the above description shall be interpreted as illustrative and not in a limiting sense.

Having described my invention, what I claim as new and desire to secure by Letters Patent is:

1. The method of cementing a plasticized vinyl resin material to a non-vinyl resin material which comprises coating the surface of the plasticized vinyl resin with a vinyl resin base adhesive containing a chrome salt, coating the surface of the non-vinyl resin material with butadiene acrylonitrile base adhesive, and thereafter pressing the coated surfaces together.

2. A method according to claim 1 wherein the said chrome salt is soluble in an organic solvent.

3. A method according to any previous claim wherein the said chrome salt is ammonium dichromate.

4. The method of cementing a plasticized vinyl resin material to non-vinyl resin material which comprises coating the surface of the plasticized vinyl resin material with a vinyl resin base adhesive containing a chrome salt and allowing the adhesive to dry thereon, coating the surface of the non-vinyl resin material with a butadiene acrylonitrile base adhesive and allowing the adhesive to dry thereon, heating the cemented surface of the non-vinyl resin material to activate the adhesive thereon, and thereafter pressing the cemented surfaces of the two materials together.

5. A method according to claim 4 wherein the said chrome salt is ammonium dichromate.

6. The method of attaching an outsole of non-vinyl resin material to a plasticized vinyl resin shoe upper which comprises coating the attaching face of said outsole with a butadiene acrylonitrile base adhesive and allowing it to dry thereon, coating the overlasted margin of said plasticized vinyl resin upper with a vinyl resin base adhesive containing a chrome salt and allowing it to dry thereon, heat activating the adhesive on said outsole, and thereafter pressing the parts together to effect a permanent bond therebetween.

7. The method of attaching a plasticized vinyl resin outsole to a non-vinyl resin shoe upper which comprises coating the attaching face of said outsole with a vinyl resin base adhesive containing a chrome salt and allowing it to dry thereon, coating the overlasted margin of said shoe upper with a butadiene acrylonitrile base adhesive and allowing it to dry thereon, activating the adhesive on said shoe upper, and thereafter pressing the parts together to effect a permanent bond therebetween.

8. The method of attaching an outsole to a shoe welt of plasticized vinyl resin which comprises coating the attaching surface of the outsole with a butadiene acrylonitrile base adhesive and allowing it to dry thereon, coating the attaching surface of the shoe welt with a vinyl resin base adhesive containing a chrome salt and allowing it to dry thereon, heating the adhesive on said outsole until it becomes activated, and thereafter pressing the outsole to the shoe welt to effect a permanent bond therebetween.

9. A method according to claims 6, 7 and 8 wherein the said chrome salt is soluble in an organic solvent.

10. A method according to claims 6, 7 and 8 wherein the said chrome salt is ammonium dichromate.

LEE L. BLYLER.

REFERENCES CITED

The following references are of record in the file of this patent:

UNITED STATES PATENTS

| Number | Name | Date |
| --- | --- | --- |
| 2,323,562 | Nugent | July 6, 1943 |